June 20, 1939.   A. V. WURMSER   2,162,874
ELECTRICAL MEASURING CIRCUIT
Filed Sept. 2, 1937
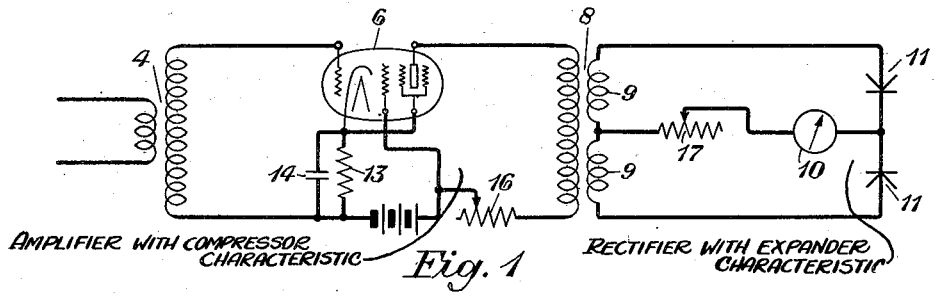
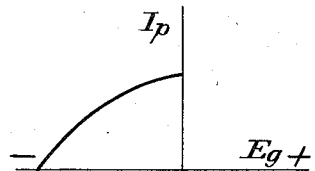
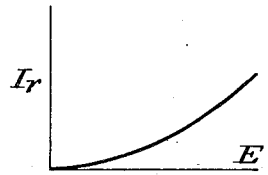
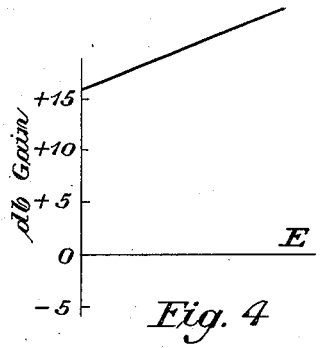
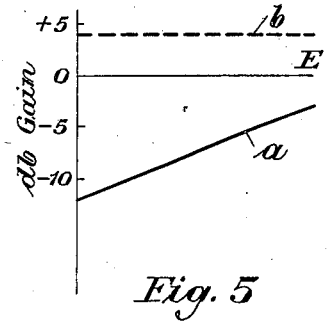
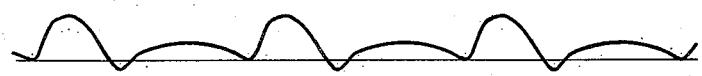
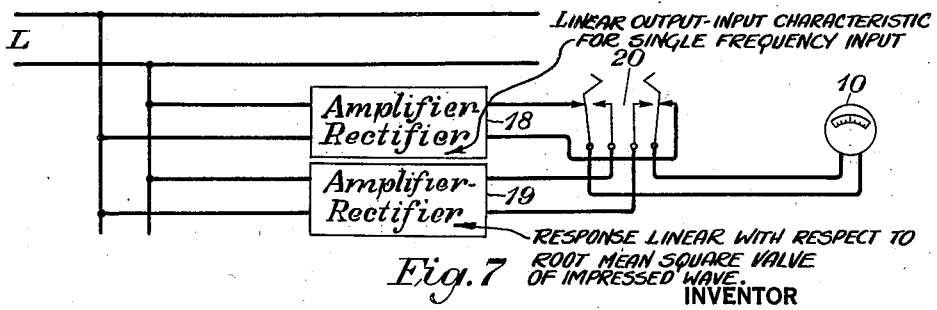
INVENTOR
A. V. Wurmser
BY
ATTORNEY Patented June 20, 1939

2,162,874

UNITED STATES PATENT OFFICE 2,162,874

ELECTRICAL MEASURING CIRCUIT

Alphons V. Wurmser, West Englewood, N. J., assignor to Bell Telephone Laboratories, Incorporated, New York, N. Y., a corporation of New York Application September 2, 1937, Serial No. 162,113

5 Claims. (Cl. 171—95)

This invention relates to electrical measuring circuits and more particularly to means for measuring the electrical power present in a circuit by a single measuring unit whether this power be in the form of simple sine wave displacements or in the form of complex wave displacements, as for noise on telephone lines.

In the case of a line on which there is impressed a pure sine wave electromotive force the power flowing in the line is proportional to the square of the amplitude. If two such waves of the same frequency and of equal amplitude are impressed in phase with each other the resultant is a single wave of double the amplitude and four times the power. If the two waves are not in phase the resultant is still a pure sine wave but of an amplitude dependent on the phase angle between the components and the power is proportional to the square of the amplitude of the resultant. If the two components are of incommensurable frequencies the power is the sum of the power due to the individual waves. So also for any complex wave made up of noncoherent components, as for noise.

Ordinarily, for alternating current circuits it is customary in taking measurements to have the voltage across a transmission line or analogous circuit or the current flowing therein impressed on some device such as a rectifier with a meter in its output operating to give a direct current reading in response to the voltage or current. The device may be so designed as to give a reading proportional to said voltage or current or a reading proportional to some power thereof. In the former case if two waves of the same frequency and amplitude and in phase with each other are present, the reading will be greater than for one of the waves by the factor 2 but the power will be four times as great. If the two waves, however, are of incommensurable frequency then the reading on the responsive device will be greater than for one by the factor $$\sqrt{2}$$

On the other hand, if a device is used in which the reading is proportional to the square of the impressed voltage, as in the case of thermocouples and various other responsive devices, then again the reading of the instrument will be different, depending upon whether the two components are of the same or of incommensurable frequencies. For the case of equal frequencies in phase the reading for two waves will be four times that for one wave whereas for incommensurable frequencies the reading will be twice that for one wave.

Recently I have devised a "linear amplifier-rectifier" described in my copending application, Case 2, Serial No. 131,190 filed March 16, 1937, now Patent 2,147,729, issued February 21, 1939, comprising an amplifier and a rectifier in tandem. Even though the amplifier and the rectifier are themselves not strictly linear, such a circuit combination may be rendered nearly linear by insertion of resistances which are quite large compared to the impedance of the amplifier or the rectifier units. Such resistances, of course, introduce large losses and thus greatly decrease the sensitivity of the measuring circuit. If these resistances are removed, then such circuits lose their linearity and at the same time I find them to be unstable due to changes in temperature and other irregularities. This I have largely overcome, as described in my copending application, by a negative feed-back connection from the output to the input of the amplifier-rectifier combination to adjust its gain in accordance with the output level, which greatly increases the stability of the circuit in a manner characteristic of feedback circuits permitting the omission of at least most of the resistance and making it possible to obtain reliable readings on the transmission characteristics of a line of a high degree of accuracy. Such a circuit is linear, its response for single frequency being proportional to the input voltage (or currents), and the recording or indicating instrument may be an ammeter with a uniform scale.

In measurements of noise effects on transmission lines it has been the necessary practice to determine the interference on a power basis using thermocouples or other devices for which the output follows quite closely the square law. The recording instrument in this case is also usually calibrated on a power basis. It is desirable in practical telephone engineering that the same recorder shall be suitable for measuring both of the types of effects heretofore discussed. However, if the linear amplifier-rectifier is calibrated so that for single frequency input the direct current output is proportional to the alternating current input, then for a complex wave of incommensurable frequencies the reading may depart some 10 or 15 per cent from that indicated by a thermocouple and if the wave is made up of a fundamental and its harmonics the error may be substantially greater, the instrument always underestimating the actual power. It is the purpose of this invention to devise a measuring circuit in which a single recording or indicating instrument with a single calibration shall be equally applicable for measuring both kinds of effects.

The invention will be better understood by reference to the following specification and the accompanying drawing, in which:

Fig. 1 is a circuit diagram of my measuring set;

Figs. 2 to 6 are curves characteristic of the different parts of the circuit; and Fig. 7 is a circuit diagram showing one way of using this invention.

Referring more particularly to Fig. 1 there is shown an input transformer 4 the primary of which is connected to the line on which measurements are desired. Connected with the secondary of the transformer 4 is the input of an amplifier 6 the output of which, through the transformer 8, is impressed on a rectifier circuit to give a direct current reading in a meter 10. The rectifier circuit may take a variety of forms but in that form shown in Fig. 1 it consists of a divided secondary 9 each half of which is connected through a rectifying element 11 across the common meter 10. These rectifying elements may be of any suitable form but one which I find especially convenient is that known as the copper-oxide rectifier.

The amplifier 6 may employ any one of a large number of types of amplifier tubes adapted for operation to give a desired characteristic to be described below, the one here shown being of the pentode type. The tube is rendered self-biasing by the resistance 13 with capacity shunt 14 in its control grid-cathode circuit. The impedance of the output circuit of this tube is also rendered variable by means of the variable resistance 16 in series in the plate-cathode circuit of the tube and the characteristic of the tube circuit may then be altered within reasonable limits. In the rectifier circuit there is included in series with the meter 10 an adjustable resistance 17 which may be used to modify to some extent the over-all characteristic of the rectifier circuit.

It is characteristic of practically all rectifying devices that the current output is not strictly proportional to the impressed voltage but is non-linear, as illustrated by the curve of Fig. 3, indicating that the current $I_r$ increases more rapidly than the impressed voltage E. The relationship may be of the form $I_r = k_1 e^m$ where $m$ may be larger or smaller than unity, although more commonly the former. If the exponent has the value 2 then the response of the meter in the rectifier output is proportional to the power impressed on the rectifier circuit. If, however, it is desired that the meter have a deflection which is proportional to the impressed voltage on a single frequency basis then some compensation must be made. This may be accomplished in the circuit of the invention shown in Fig. 1 by choosing the tube 6 and adjusting its circuit constants so that its characteristic is complementary to that of the rectifier circuit. In this event the plate current-control grid voltage characteristic of the tube 6 and its associated circuit may be shown by the curve of Fig. 2, which it will be noted would be represented by an expression of the form $I_p = k_2 e^n$ in which $n$ has a value less than unity. It will be noted that under these conditions the tube 6 and its circuit has the characteristic of a compressor, that is the amplification for large input is not as great as that for small input. On the other hand, it will be noted from Fig. 3 that the characteristic of the rectifier circuit is that of an expandor. If the characteristics are so adjusted that $$n = \frac{1}{m}$$

then the compression effect of the one is neutralized by the expansion effect of the other and the circuit is linear in its response. Such a combination gives what may be called a linear amplifier-rectifier circuit and this linearity is illustrated more fully in Figs. 4 and 5. In Fig. 5, for example, the gain of the rectifier (which in this case is a negative gain) is plotted in decibels against the input voltage and if the coefficient $m$ is constant, the gain characteristic will be a sloping straight line, as shown by curve $a$. Similarly, if the exponent $n$ is constant, then the gain characteristic of the amplifier circuit is a sloping straight line as shown by the curve of Fig. 4. If $$n = \frac{1}{m}$$

then the over-all characteristic of the circuit is represented by the broken line curve $b$ of Fig. 5, showing a gain which is independent of the impressed voltage. Such a relationship of characteristics may be obtained over a considerable range.

Now the introduction of compression at one point followed by an equal expansion would, in and of itself, yield a device with an over-all linear characteristic and for a single frequency input the output would be linearly proportional to the input amplitude, which is desirable for measurements on the transmission characteristics of a line. It would not be suitable for noise measurements which should be made on a power basis. I have discovered, however, contrary to expectations, that such a circuit may be adjusted to read on a power basis for both a single frequency wave and a complex wave. It will be observed from Fig. 2 that the single tube compressor of Fig. 1 is itself non-linear and so introduces distortion. The circuit constants are adjusted so that a pure sine wave will produce in the output of the pentode tube amplifier a lopsided wave, the loops on the one half of the wave being larger than on the other. So far as the rectifier is concerned, the transformer 8 eliminates any direct current component resulting from this distortion but nevertheless passes on a wave modified by the distortion due to the amplifier.

I have discovered that it is this property which allows the circuit as a whole to be used for measuring accurately on a power basis both for single frequency and complex impressed waves over a considerable range, with the added feature that the meter reading is linear with respect to the root mean square for both cases. The proper ratio of the amplifications of the positive and negative portions of the amplified wave to provide accurate measurements for both types of input is obtained by suitable adjustment of the circuit constants of the pentode tube 6, for example, by making the voltage on the plate of the tube of the required value to accomplish this result by adjustment of the variable resistance 16. As indicated above, the characteristic of the rectifier circuit may be modified somewhat to assist in making its characteristic complementary to that of the amplifier 6 by adjusting the variable resistance 17. A relatively simple and favorable condition is obtained when we have a dissymmetrical square root law amplifier combined with a full wave symmetrical square law rectifier but the peculiar property of the circuit referred to above is not restricted to such characteristics.

The kind of distorted wave which is passed through the transformer 8 to the rectifier in the system of Fig. 1 is indicated in one specific case by Fig. 6, which is an oscillograph record of the rectified current in the meter of the rectifier circuit with a sine wave of 100 cycles impressed on the transformer 4.

The circuit gives equally reliable determinations for both kinds of input but in telephone practice it is usually necessary to have determinations of higher accuracy on transmission characteristics and transmission levels than on noise levels. For this reason I find it convenient to use a linear amplifier-rectifier circuit suitable for measuring signal transmission, for example, the circuit of my Patent No. 2,147,729, and the circuit of this invention in parallel, but using alternately the same reading instrument, as shown in Fig. 7 where, in block form, the first-mentioned circuit is shown at 18 and the circuit of this invention at 19. By a suitable switching means 20 the meter 10 may be connected to 18 or 19, the one calibration scale serving for both circuits.

While the description thus far has implied that the recording instrument or meter shall be one in which the deflection is proportional to a voltage (or a current), this is not necessary. The instrument may be calibrated on any basis desired. For example, in many cases it would be convenient to have it calibrated on a decibel basis. In any case, however, the instrument would still be appropriate with its one scale for both circuits giving readings, when connected with the circuit 18, which are proportional to the amplitude of the single frequency wave used for transmission measurements and giving readings when connected with the circuit 19 proportional to the root mean square of the power present on the line, whether this power refers to that of a single frequency or a complex wave.

What is claimed is:

1. In a circuit for measuring the amplitude of a single frequency wave or the root mean square of a complex wave, an amplifier and a rectifier in tandem, a meter in the rectifier circuit, the amplifier circuit characteristic being non-linear and the rectifier circuit characteristic being non-linear in a complementary manner, and a transformer coupling the amplifier circuit and the rectifier circuit.

2. In a measuring circuit for alternating current wave effects, an amplifier circuit with an exponential characteristic, a rectifier circuit with an exponential characteristic, the exponent for the latter being the reciprocal of that for the amplifier circuit, a transformer coupling between the two, and a meter associated with the rectifier circuit.

3. A circuit for accurately measuring the volume level of single frequency or complex waves over a wide range of volumes comprising an amplifier-rectifier in which the compression characteristic of the amplifier is substantially complementary to the expansion characteristic of the rectifier, means to impress the wave to be measured on the input of said amplifier-rectifier, means to cause said amplifier to produce a different amplification for the positive portion of the applied wave than for the negative portion thereof in the proper ratio to provide correct power addition, means to suppress from said rectifier the direct current component introduced by the different amplification of the two portions of said wave, and a single linear decibel meter for indicating the level of the rectified current in the output of said amplifier-rectifier.

4. A measuring circuit comprising a dissymmetrical square root law amplifier, a full-wave symmetrical square law rectifier, a transformer coupling the output of said amplifier to the input of said rectifier and a meter for indicating the rectifier output.

5. A circuit for measuring the amplitude level of alternating current waves comprising a pentode vacuum tube for amplifying said waves, a symmetrical full-wave rectifier having an expander characteristic for rectifying the amplified waves, a transformer coupling the output of said vacuum tube to the input of said rectifier, means for controlling the output impedance of said tube so that it provides unequal amplification of the positive and negative portions of the impressed waves in a desired ratio, and has a compressor characteristic which is substantially complementary to the expander characteristic of said rectifier for a substantial range of input level, and a meter for indicating the rectifier output.

ALPHONS V. WURMSER.